United States Patent
Puckette, IV (10) Patent No.: US 6,377,565 B1
(45) Date of Patent: Apr. 23, 2002

(54) ADAPTIVE PROPAGATION DELAY COMPENSATION FOR TDMA COMMUNICATIONS SYSTEMS

(75) Inventor: Charles McDonald Puckette, IV, Scotia, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/162,805

(22) Filed: Sep. 29, 1998

(51) Int. Cl.$^7$ ................................................. H04J 3/16
(52) U.S. Cl. ......................................................... 370/337
(58) Field of Search .................................. 370/282, 278, 370/503, 508, 519, 442, 337, 341, 311, 321, 324, 326, 332, 333, 334, 339, 347, 350, 349, 501; 342/33, 36, 40, 140, 357, 463, 41; 375/356, 354, 355; 455/509, 515, 517, 502, 500

(56) References Cited

U.S. PATENT DOCUMENTS 5,365,516 A * 11/1994 Jandrell ....................... 370/335
5,526,357 A * 6/1996 Jandrell ....................... 370/346
5,920,278 A * 7/1999 Tyler et al. ................... 375/356

* cited by examiner

Primary Examiner—Dang Ton
(74) Attorney, Agent, or Firm—John F. Thompson; Jill M. Breedlove (57) ABSTRACT

A propagation delay compensation device and method provide adaptive propagation delay compensation in a time division multiple access (TDMA) communications system. The device includes a range computation unit and a delay computation unit. The range unit receives data signals to identify respective positions of a base station and a transceiver and, in response, generates a signal indicating line-of-sight range between the base station and the transceiver. The delay unit receives the range signal and, in response, generates a required delay which provides for alignment of communications signals received at the base station to arrive in alignment with assigned time slots at the base station. In one embodiment, the invention enables communication from aircraft through TDMA cellular systems using standard TDMA waveform formats.

11 Claims, 5 Drawing Sheets

ADAPTIVE PROPAGATION DELAY COMPENSATION FOR TDMA COMMUNICATIONS SYSTEMS

BACKGROUND OF THE INVENTION

1. Field of the Invention

This invention relates to a communication system that improves upon time division systems using guard fields for passive compensation of propagation delays. In one specific embodiment, the invention relates to a device and method enabling reliable and more flexible and efficient synchronization of time division multiple access (TDMA) radiofrequency (rf) transmissions, including such transmissions from airborne platforms, through adaptive propagation delay compensation.

2. Description of the Related Art

Many wireless communications systems currently provide digital communications services to multiple users in accordance with a narrow band TDMA (NBTDMA) random access communications standard. Such standards include the North American Digital Cellular standard IS-136 (used in the U.S.), the Global System for Mobile Communications (GSM) standard (which is a non-U.S. standard for all-digital cellular communications), and the Japanese digital cellular standard. Some non-telephonic systems use NBTDMA formatted transmissions as well, such as various military and defense-related systems, wireless LANs, and NASA's Advanced Communications Technology Satellite (ACTS) system.

An NBTDMA system provides communications services to multiple users through shared access to common narrowband transmission channels. The system supports transmissions by several users on each channel by dividing the transmission time over the channel into a series of discrete frames. Each frame, in turn, includes a sequential series of data slots. The system waveform for the channel is thus comprised of a common number of data slots organized in each of a repeating series of discrete frames.

Several users can communicate simultaneously over a given channel because the system assigns to each user's transceiver one or more data slots in the frame structure. A transceiver organizes its messages into series of burst transmissions and coordinates these bursts to coincide with its assigned data slots. Access to the channel therefore passes sequentially from one user to the next, in accordance with the pattern of data slot assignments.

All of the users of a NBTDMA channel therefore transmit over the same transmission frequency, but no two users transmit at the same time. Each avoids interference with the transmissions of the others by restricting its transmissions to coincide accurately with its data slots as assigned by the receiving base station. The accurate coordination of a transceiver's transmissions, so as to coincide with its assigned transmission slots (as observed at the base station), constitutes timing synchronization.

The IS-136 format and other TDMA signaling formats have a principal objective of enabling multiple users to share simultaneous access to an assigned frequency channel through timing synchronization. TDMA synchronization is described in, for example, U.S. Pat. Nos. 5,177,740, granted Jan. 5, 1993 to Toy et al.; U.S. Pat. No. 5,283,815, granted Feb. 1, 1994 to Chennakeshu et al.; and U.S. Pat. No. 5,343,498, granted Aug. 30, 1994 to Toy et al.

Efficient use of available transmission spectrum requires a NBTDMA transmission format to use as little data capacity as possible for transmission overhead functions, such as synchronization. In turn, a system requires less data capacity for synchronization when the user transmissions, upon receipt at the base station, more precisely align with the users' respectively assigned data slots. The necessary degree of precision demands that the system even account for differences in signal propagation times between different transceivers. Because a transmitted signal requires more time to reach the base station if the transceiver is farther away, a longer propagation delay is encountered for the more distant transceiver's transmissions.

Traditional NBTDMA systems have accommodated the existence of varying propagation delays by padding each data slot with a guard field. In accordance with the IS-136 standard, cellular TDMA random access transmissions use a nominal signaling rate of 48.6 kbps, which corresponds to a bit period of about 20.6 microseconds.

Each guard field (also referred to as a guard time) provides a delay time of six bit periods, or about 123 microseconds. The guard time lengthens the time interval allotted by a base station for receiving a burst transmission from a transceiver. As long as the propagation delay from a transceiver does not exceed this guard time, that transceiver's transmissions will not overlap into data slots reserved for other users.

Although guard fields add to transmission overhead because they occupy transmission time that the system could otherwise use for user data, their inclusion has been necessary for synchronization in conventional TDMA systems. For example, a typical TDMA cellular system divides its service area into many overlapping cells. These cells may vary in size from one locality to another, with smaller cells used where user traffic requires more system capacity. Each cell has a base station that services calls placed by transceivers located within the cell.

These systems have minimized guard field overhead by restricting guard field length to the minimum number of bits necessary to accommodate their largest cells. That is, the guard field is limited in length, or time, to the minimum necessary to compensate for the propagation delay arising from the maximum range allowed between a base station and a transceiver within that base's cell.

The efficacy of guard fields in ensuring synchronization therefore depends upon restricting transceivers to a specified maximum range from their currently assigned base stations. A ground-based transceiver accommodates this restriction inherently, because movement beyond the specified maximum range necessitates entry into a new cell, at which time the system reassigns the transceiver to the base station of the new cell. The guard fields continue to provide adequate guard times because, upon entry into the new cell, the transceiver lies within the specified maximum range to the new base station.

A problem with use of guard fields has arisen, however, as cellular system coverage has expanded. Cellular systems may be used to offer service to transceivers aboard aircraft. In addition, NBTDMA communication readily admits of application to missile systems, satellites in low Earth orbit, and lighter-than-air craft. Airborne platforms of this type constitute new and growing areas of application for NBTDMA technology. The guard field approach proves inadequate in each of these areas because the airborne platform is maintained at some substantial altitude above ground level while it occupies airspace over a given cell. The base station of that cell constitutes the system base station nearest the airborne platform.

Due to the platform altitude above ground level, the distance between the platform and the system base station transmission may exceed the specified maximum range achieved by ground-based transceivers. In the frequently-occurring worst case, the platform altitude alone exceeds the specified maximum range and the propagation delay always exceeds the guard time.

The minimum-length guard fields which are adequate for strictly ground-based systems therefore fail to allow transceivers aboard airborne platforms to time-synchronize with their base stations. A possible solution to this problem entails enlarging the guard fields, thereby providing longer guard times that accommodate longer propagation delays. However, use of larger guard fields would reduce system capacity, as indicated above. Moreover, transceivers may be carried at altitudes ranging from a few hundred feet to several miles or more. Guard fields large enough to accommodate such wide ranges would not be practical for commercial communications systems.

SUMMARY OF THE INVENTION

A delay compensation system and method are provided for enabling a transceiver aboard an airborne platform to properly align its transmissions with its assigned NBTDMA data slots. The system and method are backwards-compatible with communications systems implemented in accordance with existing NBTDMA transmission formats. This compensation system and method allows design of new NBTDMA formats that completely eliminate use of guard fields and their accompanying transmission overhead requirements.

The invention, which provides adaptive propagation delay compensation in a communications system, employs a range computation unit that receives a transceiver position data signal and a base position data signal, respectively representative of a mobile transceiver position and a base station position. The range computation unit generates a signal measuring line of sight range between the mobile transceiver and the base station assigned to the transceiver. The transceiver and base station communicate through a time division multiple access communication signal. A delay computation unit that receives the direct range measurement signal generates the required delay measured relative to the received communication signal so that the communication signal transmitted from the transceiver to the base station arrives in alignment with its assigned time slot.

DETAILED DESCRIPTION OF THE PREFERRED EMBODIMENTS

The invention addresses, in the first instance, a problem arising in the use of digital cellular transceivers carried aboard airborne platforms such as aircraft. The solution the invention provides for this problem, however, readily extends to related problems and limitations with conventional TDMA technology generally. Accordingly, the invention also encompasses systems addressing these related problems and limitations in environments other than airborne platforms.

Figure 1:
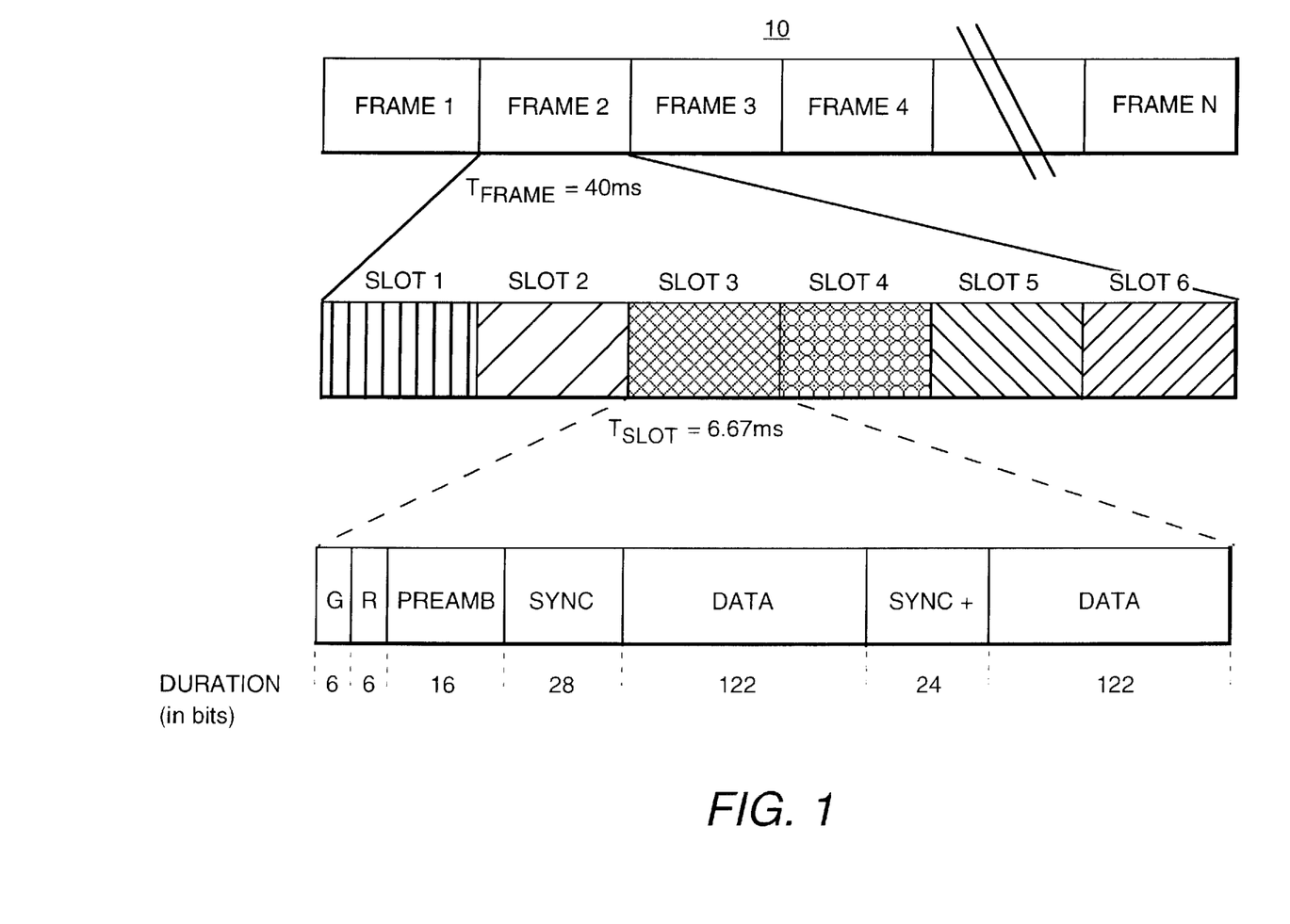
FIG. 1 is a representation of the frame/slot data format for digital cellular telephone transmissions in accordance with the North American Digital Cellular (IS-136) TDMA standard.

FIG. 1 is a diagram representing a continuous rf waveform (or transmission signal) 10 formatted in accordance with the IS-136 standard for cellular TDMA random access transmissions. These transmissions use a nominal signaling rate of 48.6 kbps, which corresponds to a bit period of about 20.6 microseconds.

The IS-136 format divides the signal into successive frames 1, 2, . . . , N of data, each having a duration of 40 ms. Each frame, in turn, has six data slots (slots 1, 2,. . . , 6) of uniform duration (6.67 ms). Each data slot includes a guard field G and a ramp field R of six bits each, and a preamble of 16 bits. A synchronization field of 28 bits precedes two 122-bit data fields separated by an additional sync field of 24 bits.

The six bit guard field G (also referred to as a guard time) provides a delay of six bit periods, or about 123 microseconds. The guard time lengthens the time interval allotted by a base station for receiving a burst transmission from a transceiver. As long as the propagation delay from a transceiver does not exceed this guard time, transmissions from the transceiver will not overlay into data slots reserved for other users.

Figure 2:
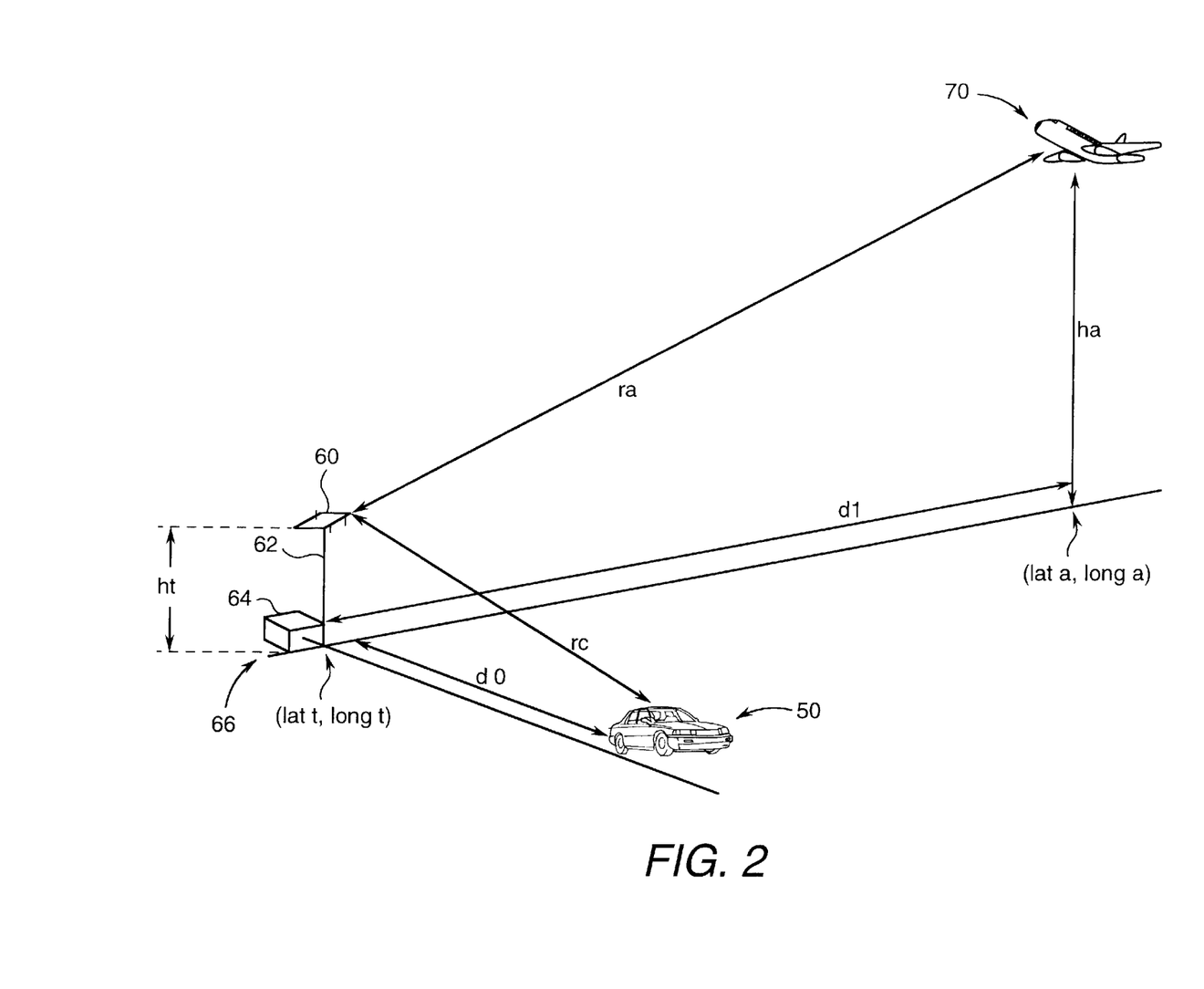
FIG. 2 illustrates the geometry of one form of the propagation delay problem solved by the invention, in which a TDMA transceiver is located aboard an aircraft in flight.

FIG. 2 illustrates the geometry of a typical environment to which the invention applies. A ground vehicle, such as an automobile 10, may carry a TDMA transceiver, such as a cellular telephone (not shown). The transceiver transmits communication signals to an antenna 60 mounted atop an antenna tower 62 at a local base station 64. In a typical cellular system, base station 64, tower 62, and antenna 60 are installed at a fixed base station site 66. The invention also applies, however, in a TDMA system for which base station site 66 itself is mobile.

The transmissions typically conform to a TDMA format standard, such as IS-136 or GSM, that includes a guard field G for each data slot (see FIG. 1). If automobile 10 remains within the base station cell (not indicated), then the direct range rc from antenna 60 to automobile 10 will never exceed the maximum range accommodated by the guard fields. In the illustration, rc never exceeds the tower-to-auto ground distance d0 by more than the tower height ht. (This fact follows from the Pythagorean Theorem.)

In contrast to a ground mobile platform, an airborne platform, such as airplane 70, operates at an altitude ha above the ground, substantially increasing the antenna-to-airplane direct range ra relative to the tower-to-airplane ground distance d1. Even if distance d1 places the airplane ground location (lata, longa) within the cell, altitude ra will usually exceed the maximum range allowed by the guard fields.

The invention overcomes this problem by utilizing an adaptive propagation delay compensation device. The inclusion of a guard field G in each data slot of a conventional TDMA transmission waveform constitutes passive delay compensation by providing the same guard time, regardless of the actual propagation delay associated with the signal from a particular transceiver. This passive delay compensation forces the base station to allocate an enlarged, one-size-fits-all time interval for all incoming data slots. All transmissions from within the base station cell fit within the allocated time interval because the guard field is selected to be sufficiently long to accommodate transmissions from the perimeter of the cell.

The invention, in contrast, requires the transceiver to adapt the amount of delay compensation to the actual distance between the base station and the transceiver, thus enabling synchronization of TDMA signals from transceivers aboard airborne platforms at high altitudes. Such signals cannot be effectively synchronized using only standard formatted guard fields, because the sending transceivers are at direct ranges exceeding the maximum range that can be accommodated by the standard formatted guard fields.

Figure 3:
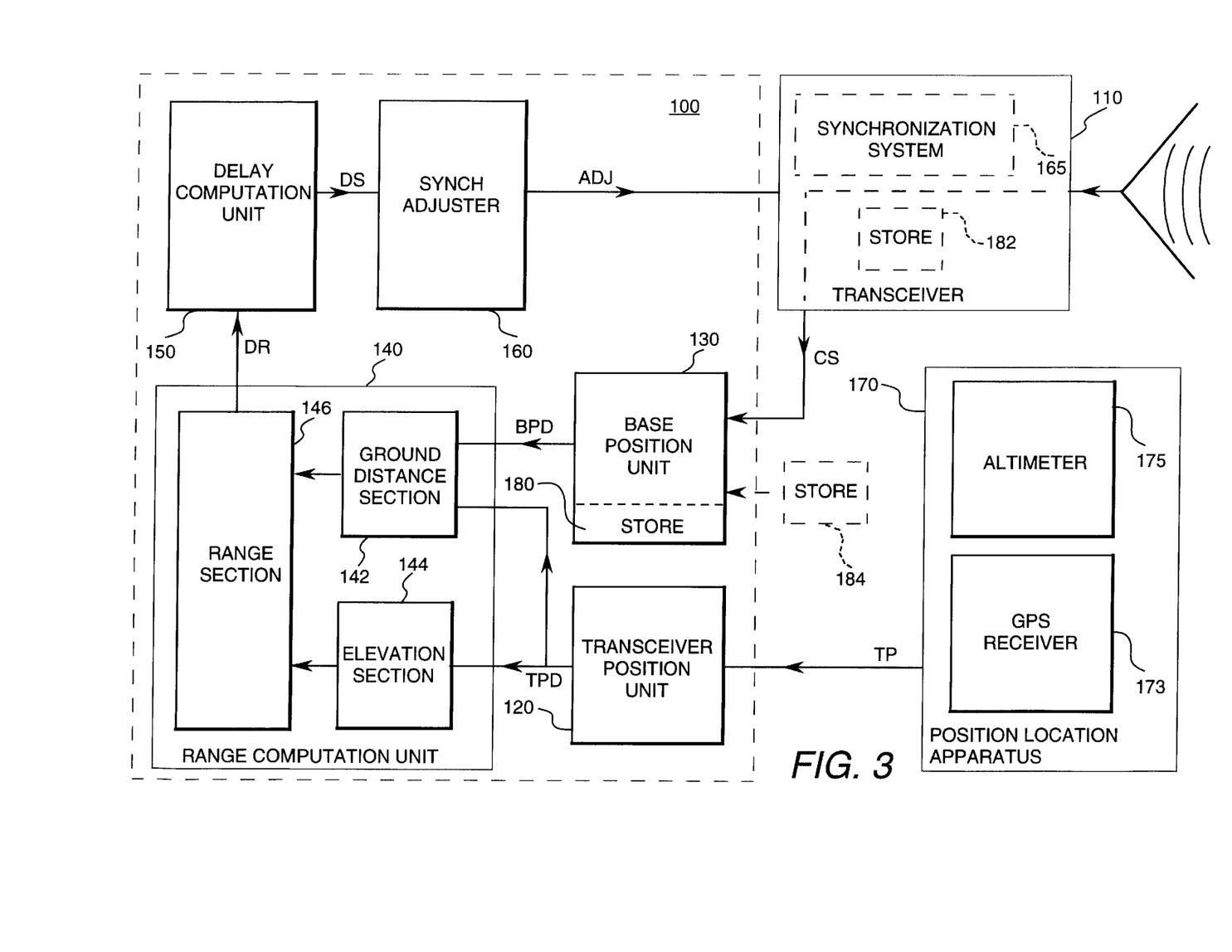
FIG. 3 is a block diagram of an embodiment of a delay compensation device for operation with a TDMA transceiver and position location apparatus in accordance with the present invention.

FIG. 3 illustrates an adaptive propagation delay compensation device 100 in accordance with the invention. Device 100 adaptively compensates for the propagation delay of signals transmitted by a TDMA transceiver 110 by determining the distance over which the signals propagate, calculating the associated propagation delay and then adjusting transmissions from transceiver 110 to maintain synchronization at the base station. Device 100 thus enables transceiver 110 to maintain synchronization even when transceiver 110 is carried aboard an aircraft 70 (FIG. 2).

Device 100 comprises a transceiver position unit 120 and a base position unit 130, respectively providing, to a range computation unit 140, a transceiver position data signal TPD and a base position signal BPD. Range computation unit 140 receives signal BPD at a ground distance section 142 and signal TPD at an elevation section 144. A range section 146 receives a height difference value from elevation section 144 and a ground distance value from ground distance section 142. Range section 146 computes a range value on the basis of the height difference value and the ground distance value.

A delay computation unit 150 receives from range computation unit 140 a direct range signal DR representing the range value, from which delay computation unit 150 computes a delay signal DS. A synchronization adjuster 160 receives the delay signal DS and generates an adjustment signal ADJ for return to transceiver 110. Alternatively, synchronization adjuster 160 may constitute a part of transceiver 110, specifically as an element of a synchronization system 165.

Transceiver 110 is carried aboard an aircraft either as an installed unit or as a portable device. A position location apparatus 170 is also carried aboard the aircraft and is installed in close proximity to transceiver 110. (In the context of this invention, "close proximity" means within the spatial resolution of position location apparatus 170. Close proximity is required because device 100 provides propagation delay compensation to transceiver 110 based upon position information provided by position location apparatus 170. If apparatus 170 and transceiver 110 are not in close proximity, device 100 will incorrectly compensate for the propagation delay of transmission signals from transceiver 110. Alternatively, however, device 100 can be calibrated to account for any distance separating transceiver 110 and apparatus 170 which then can be located independently.) Apparatus 170 generates transceiver position information that identifies the location of transceiver 110 in any suitable coordinate system. In a preferred embodiment, this information includes the aircraft ground position latitude, ground position longitude, and altitude above the ground.

Because only distances are important here, the actual choice of coordinate system is not important. In a preferred embodiment, the coordinate system is the three-dimensional coordinate system provided by latitude, longitude, and altitude. The invention can alternatively use any other such three-dimensional coordinate system that unambiguously locates the transceiver and the base station.

Position location apparatus 170 may include a Global Positioning System (GPS) receiver 173. Currently such receivers have spatial resolutions as small as 10 meters (m). Transceiver 110 and position location apparatus 170 would then be in close proximity if they are located for operation at positions less than 10 m apart. If the mobile platform is an ocean vessel such as a petroleum supertanker or an aircraft carrier, then transceiver 110 and apparatus 170 likely cannot be positioned in arbitrary locations on the vessel and still satisfy the close proximity condition. Other factors may require them to be located immediately adjacent one another, or even installed on a common hardware chassis.

Position location apparatus 170 generates a transceiver position signal TP and sends it to transceiver position unit 120. Signal TP represents transceiver position data that device 100 uses, along with base position data, to compute the direct range between transceiver 110 and base station 64. In a preferred embodiment, apparatus 170 includes an altimeter 175 so that the transceiver position data of signal TP can then include an altitude value ha (FIG. 2) corresponding to the altimeter reading. Alternatively, GPS receiver 173 itself may provide transceiver position data in three independent coordinates as indicated in FIG. 2: altitude value ha, latitude lata and longitude longa.

Position location apparatus 170 may generally comprise any suitable position location instrumentation, electronic or nonelectronic, the only constraint being that it generate location data sufficiently accurate to enable device 100 to provide useful propagation delay compensation. Apparatus 170 thus may include any of a radiating electronic system, such as a Loran C or Decca, a directional beacon receiver, and an instrument landing system; a nonradiating system, such as inertial or astronomical navigation equipment; or other such systems.

Base position unit 130 generates signal BPD in any of various ways. In a first embodiment, unit 130 receives a control signal CS through transceiver 110 from base station 64 (FIG. 2) to indicate a base position, such as a base longitude longt and a base latitude latt.

In a second embodiment, base position unit 130 stores, in a store unit 180, a base position table that includes a base identification code and base position data for each base station in the TDMA system. Alternatively, the table may reside in a store unit 182 of transceiver 110 or in a separate store unit 184. In this embodiment, signal CS includes a representation of the identification code of base station 64. Base position unit 130 then retrieves the relevant base position data from the base position table using the identification code.

Device 100 operates in the following manner for a cellular TDMA system in which the transceiver is carried aboard an airborne platform, such as airplane 70 (FIG. 2). However, the invention also encompasses related signaling methods implemented in other TDMA environments and other mobile platform contexts.

Transceiver 110, located aboard airplane 70 (FIG. 2) in flight, initiates a log-on process with base station 64 (FIG. 2) to establish a control channel therebetween, prior to placing a call. In a preferred implementation, base station 64 automatically sends over the control channel a digital word indicating location of base station 64. Alternatively, device 100, transceiver 110, or an external storage unit (not shown) can store data indicating the location of base station 64. Transceiver 110 then uses a base station identification code, sent from base station 64 over the control channel, to retrieve the stored location data.

Knowing the location of base station 64 and the ground location and altitude of airplane 70, device 100 computes the direct range (i.e., line-of-sight distance) from airplane 70 to base station 64. Device 100 then applies the computed direct range value to a predetermined wave propagation formula relating speed of propagation, distance, and associated signal propagation time. This formula, in general terms, provides a propagation delay value as a ratio of the direct range value to the propagation speed. The propagation speed may be determined in advance or computed in accordance with current conditions, and the formula may also include various compensating terms, as are well known in the radio communications arts.

Device 100 generates, from the computed propagation delay, an adjustment signal ADJ containing adjustment information corresponding to the propagation delay, which it sends to transceiver 110. Transceiver 110 then adjusts its signal generation, in accordance with signal ADJ, so that the transmission signals arrive at base station 64 in synchronization with the TDMA frame structure at base station 64. That is, each transmission will arrive at base station 64 in accordance with the allotted guard time requirements of the TDMA system signaling format. Alternatively, of course, device 100 can control adjustment of the transceiver 110 signal generation timing directly through signal ADJ.

In operation, signals transmitted between transceiver 110 and base station 64 undergo a propagation delay $td=ra/ci$, where $ci$ represents propagation velocity of the transmitted signal (i.e., the speed of light through the intervening atmosphere). Device 100 first computes td so that signals transmitted from transceiver 110 can be adjusted, or offset, by an amount that permits the signals to properly coincide with the assigned data slots of transceiver 110 at base station 64. The computation proceeds, using base position data and transceiver position data to generate a value for the base-to-transceiver ground distance d1. The base and transceiver position data may represent, respectively, the base location given as latitude and longitude (latt, longt) and the aircraft location given as (lata, longa). Altimeter 175 or, alternatively, GPS receiver 173, provides output data representing the altitude ha of airplane 70 and included in the transceiver position data signal.

Figure 4:
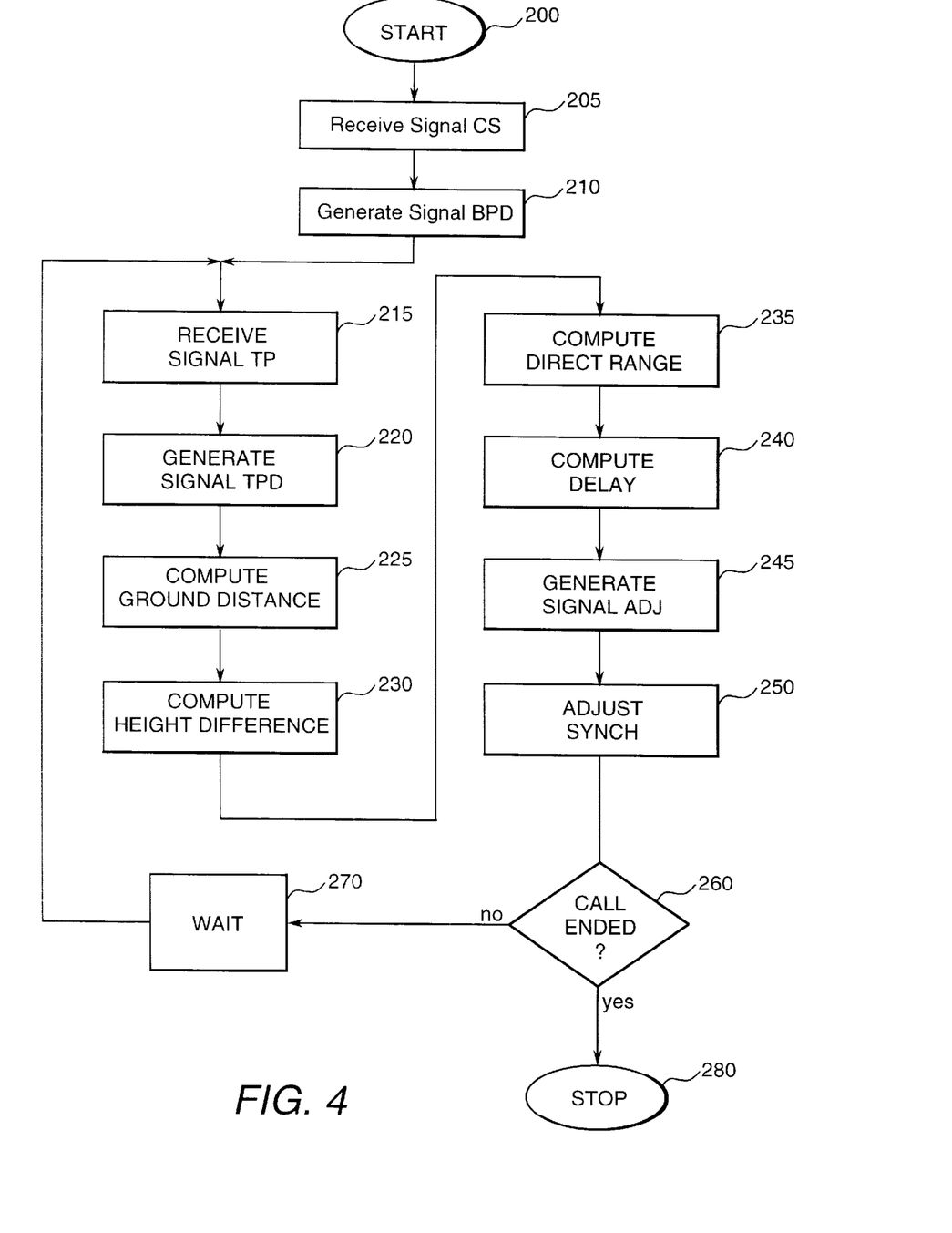
FIG. 4 is a flow chart of a method of operating the delay compensation device of FIG. 3.

The operation of device 100, as shown in FIG. 4, begins at step 200 with an instruction to transceiver 110 to initiate a call. In a typical TDMA cellular system, base station 64 has a fixed location that may be represented in location data stored in a storage unit, such as store unit 180,182, or 184, on board airplane 70.

In the course of the log-on process, base station 64 transmits a unique digital code word that can be used as an identifier in the US Digital Cellular system. Transceiver 110 receives control signal CS, which includes this code word, at step 205. The code word is used to identify a storage address for retrieving the base station's latitude and longitude from storage.

In an alternative embodiment, base station 64 may use a modified control channel structure that provides base position data to transceiver 110. Here, transceiver 110 sends to base station 64 a control channel message indicating that transceiver 110 requires base position data for synchronization. This message may simply specify that transceiver 110 is an airborne unit.

At step 210, signal BPD is generated, either from signal CS or from stored location data. In the meantime, at step 215, device 100 receives transceiver position signal TP from position location apparatus 170. Signal TPD is then generated by transceiver position unit 120 (FIG. 3) at step 220.

The process advances to step 225, where ground distance section 142 (FIG. 3) computes the ground distance between base station 64 and transceiver 110. Elevation section 144 next computes the height difference (tower height ht subtracted from airplane altitude ha) at step 230. Range section 146 then computes the direct range at step 235.

Delay computation unit 150 then computes, at step 240, the propagation delay of signals transmitted from transceiver 110 to base station 64. The delay value thus generated is converted at step 245 to corresponding adjustment instructions, and the synchronization of transceiver 110 is adjusted at step 250.

At step 260 a determination is made as to whether the call initiated at step 200 has ended. If the call has not ended, then a wait step 270 is entered, during which transceiver position unit 120 waits a specified period of time before returning to step 215 to receive a new signal TP. If the call has ended at step 260, then the process ends at step 280.

Computation of td typically occurs aboard the mobile platform (e.g., airplane 70) through operation of a device such as device 100. Of course, an integral mobile station may include both transceiver 110 and device 100. Alternatively, device 100 may be located and compute td at another location, such as at base station site 66.

"Ground distance", as used in conjunction with FIG. 2, means the line-of-sight distance between base station 64 and the ground position directly below airplane 70. In the typical case, base station 64, tower 62, and antenna 60 will all be located in close proximity at base station site 66. Alternatively, base station 64 may be located away from antenna 60, in which case ground distance refers to the distance between the ground position below airplane 70 and the ground position below antenna 60.

If the elevation difference between base station site 66 and the ground location of airplane 70 is not significant, then the problem of determining the antenna-to-airplane direct range ra reduces to computing the hypotenuse of the right triangle whose base is d1, and whose side is ha−ht. The propagation delay td therefore equals the positive square root of $[d1^2+(ha-ht)^2]/c$ where c is the velocity of light. In some instances, the aircraft altitude will be sufficiently large with respect to the height of the tower that ha−ht may be approximated by ha. An appropriate formula may be applied for an obtuse or acute triangle if site 66 and the airplane ground location differ significantly in elevation.

Device 100 next applies the computed value td to adjust the burst transmissions of transceiver 110. In particular, the process enables the timing of each burst transmission to be offset from the time reference established by the received frame sync on the control channel.

The process repeats its computation of td and transceiver adjustment regularly and frequently, because the airborne platform (e.g., airplane 70) is moving. As a result, in the usual case, the propagation delay will be periodically updated. The frequency of these updates, determined by the wait time at step 270, may be chosen to reflect the amount of guard time (i.e., the length of the guard fields) specified in the waveform format. The amount of guard time provided by the format determines the amount of movement by the mobile platform that the system will tolerate, without losing synchronization.

The invention additionally has substantial application to ground-based transceivers. In a TDMA cellular system, for example, reliance upon guard fields (passive delay compensation) limits the (normalized) cell size to a predetermined maximum radius R1. To accommodate transmissions from any point within a cell of this size, the TDMA format must include guard fields of predetermined minimum length (for example, six bits in the IS-136 standard).

The requirements imposed by passive delay compensation have two drawbacks. The limitation on cell size prevents use of oversized cells, even in sparsely populated areas where even large cells would otherwise provide adequate user capacity. Cells smaller than needed for capacity demands raise system costs; i.e., they increase the number of cells, and hence the number of base stations, beyond those the system otherwise requires to satisfy the level of traffic.

A fixed guard field length also wastes resources by forcing the system to dedicate a fixed amount of data capacity, in each data slot, for delay compensation. A transceiver signaling from a position near its assigned base station must include the entire guard field (for example, six bits) in each data slot it sends. However, synchronization at the base station does not require the full guard time this provides, because the actual propagation delay is much less than the guard time. To the extent of the excess, the guard field in this instance constitutes wasted data capacity.

Figure 5:
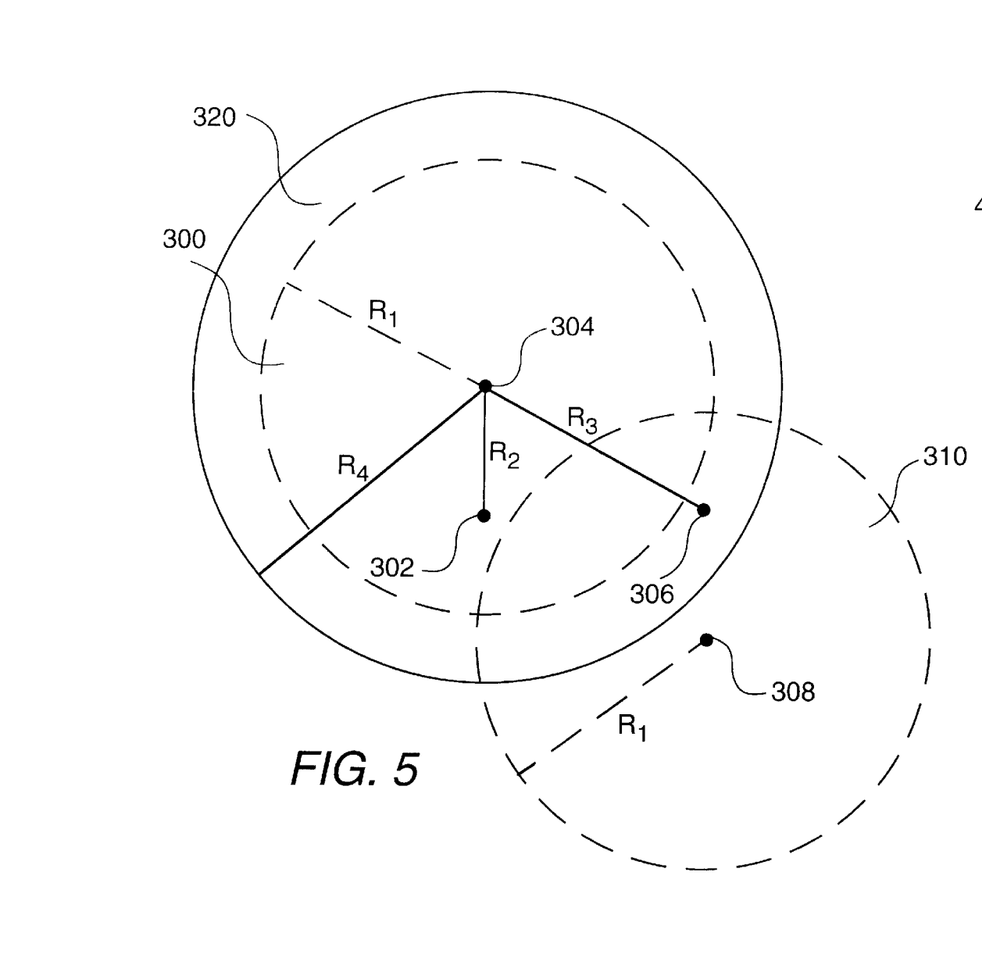
FIG. 5 graphically illustrates one advantage of the invention when applied to a ground-based TDMA transceiver.

FIG. 5 illustrates how the invention substantially avoids the waste resulting from an excessive number of cells and an oversize guard field. A cell 300 (idealized as circular, for clarity) has a radius R1 corresponding to the maximum range accommodated by standard six-bit guard fields. A transceiver signaling at position 302 lies at a direct range R2 from base station 304. Thus the transceiver can signal in accordance with the IS-136 format and rely upon passive delay compensation from the guard fields for synchronization at base station 304.

If the transceiver moves to position 306, however, the system must hand off its transmissions to a base station 308 of a second cell 310. Position 306 lies at a direct range R3 from base station 304, and this distance exceeds the maximum range R1 allowed by the six-bit guard fields. The cellular system must therefore include the second base station 308 to permit calls from positions such as position 306.

It may happen that the surrounding area is sparsely populated and does not require the user capacity provided by cells of radius R1. For example, a cell radius R4, encompassing a cell 320 about base station 304, could provide adequate user capacity for such an area. This cell size cannot easily be accommodated by the standard IS-136 signaling format using six-bit guard fields because the propagation delay from position 306 would exceed the guard time provided by six-bit guard fields. Accordingly, a system using the adaptive delay compensation provided by this invention can retain its standard format, with guard fields, and yet avoid the unnecessary costs of smaller cells.

Figure 6:
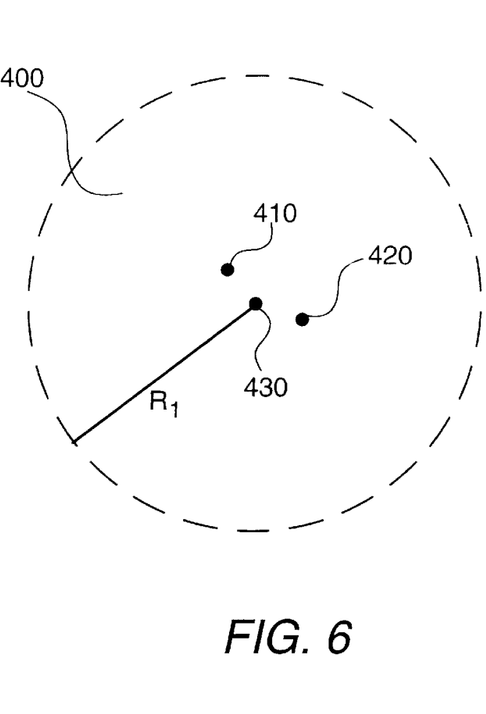
FIG. 6 graphically illustrates another advantage of the invention when applied to a ground-based TDMA transceiver.

On the other hand, and as illustrated in FIG. 6, it may happen that the user of a transceiver in a given cell, such as cell 400 with radius R1, rarely or never uses the transceiver system at locations near the perimeter of the cell. For example, the user may make calls primarily from an office at location 410 and a city park at location 420. This transceiver always stays near base station 430, and so its transmissions always have propagation delays substantially less than the guard time provided by six-bit guard fields.

The present invention thus permits the transceiver to divert the data capacity, normally occupied by guard fields, to transmission of useful data. Rather than using six full bit intervals for a guard field, the system can rely instead upon adaptive delay compensation to ensure synchronization. The system may reserve only one (or a portion of one) bit interval for a residual guard field, and use the rest of the standard guard field for data. If the user ventures farther from base station 430, the system can still use the diverted portion of the guard field for data because the adaptive compensation of the invention ensures synchronization.

The invention also applies to areas other than cellular communications. For example, because the transceiver need not be within a specified maximum distance from the base station, the base station itself can be mobile. This embodiment could find application in, for example, military field communications systems.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A propagation delay compensation device for use in a time division multiple access communications system having a base station and a transceiver assigned to said base station, said device comprising:

a range computation unit for receiving a base position data signal and a transceiver position data signal and generating therefrom a measurement signal for line of sight range between said base station and said transceiver, wherein said base position data signal identifies the base station position and said transceiver position data signal identifies the transceiver position;

a transceiver position unit in communication with said range computation unit for generating said transceiver position data signal to indicate said transceiver position in a three-dimensional coordinate system wherein said time division multiple access communications system comprises a position location apparatus situated in close proximity to said transceiver position unit and said transceiver position unit being adapted to receive a transceiver position signal from said position location apparatus and to generate said transceiver position data signal from said transceiver position signal wherein said position location apparatus comprises an electronic navigation system receiver and an altimeter;

a base position unit in communication with said range computation unit for generating said base position data signal to indicate said base station position in said three-dimensional coordinate system, said base position unit is adapted to generate said base position data signal from a control signal received from said base station;

a delay computation unit for receiving said measurement signal and generating therefrom a required delay measured relative to a received communication signal transmitted from the transceiver to the base station, the required delay providing for the received communication signal to arrive at the base station in alignment with a time slot assigned thereto; and a mobile platform comprising an airborne platform wherein said position location apparatus and said transceiver being disposed in common aboard said mobile platform wherein said altimeter is adapted to generate an indication of altitude of said airborne platform and said transceiver position signal representing transceiver position data including a transceiver altitude value corresponding to said indication of altitude, transceiver longitude data indicating longitude of said airborne platform, and transceiver latitude data indicating latitude of said airborne platform;

wherein said base station includes an antenna tower and said base position data signal represents base position data including base longitude data indicating longitude of said base station and base latitude data indicating latitude of said base station, wherein said range computation unit comprises:
- a ground distance section for computing ground distance between said airborne platform and said base station on the basis of said transceiver latitude data, said transceiver longitude data, said base latitude data, and said base longitude data;
- an elevation section for computing a height difference by subtracting height of said tower from said altitude value, and
- a range section for computing, as said line of sight range, the positive square root of the sum of said height difference squared and said ground distance squared.

2. A propagation delay compensation device for use in a time division multiple access communications system having a base station and a transceiver assigned to said base station, said device comprising:

a range computation unit for receiving a base position data signal and a transceiver position data signal and generating therefrom a measurement signal for line of sight range between said base station and said transceiver, wherein said base position data signal identifies the base station position and said transceiver position data signal identifies the transceiver position;

a transceiver position unit in communication with said range computation unit for generating said transceiver position data signal to indicate said transceiver position in a three-dimensional coordinate system wherein said time division multiple access communications system comprises a position location apparatus situated in close proximity to said transceiver position unit and said transceiver position unit being adapted to receive a transceiver position signal from said position location apparatus and to generate said transceiver position data signal from said transceiver position signal;

a base position unit in communication with said range computation unit for generating said base position data signal to indicate said base station position in said three-dimensional coordinate system, said base position unit is adapted to generate said base position data signal from a control signal received from said base station; and a delay computation unit for receiving said measurement signal and generating therefrom a required delay measured relative to a received communication signal transmitted from the transceiver to the base station, the required delay providing for the received communication signal to arrive at the base station in alignment with a time slot assigned thereto, wherein said propagation delay compensation device and said base station are disposed at a common site.

3. A propagation delay compensation device for use in a time division multiple access communications system having a base station and a transceiver assigned to said base station, said device comprising:

a range computation unit for receiving a base position data signal and a transceiver position data signal and generating therefrom a measurement signal for line of sight range between said base station and said transceiver, wherein said base position data signal identifies the base station position and said transceiver position data signal identifies the transceiver position;

a transceiver position unit in communication with said range computation unit for generating said transceiver position data signal to indicate said transceiver position in a three-dimensional coordinate system wherein said time division multiple access communications system comprises a position location apparatus situated in close proximity to said transceiver position unit and said transceiver position unit being adapted to receive a transceiver position signal from said position location apparatus and to generate said transceiver position data signal from said transceiver position signal wherein said position location apparatus comprises an electronic navigation system receiver;

a base position unit in communication with said range computation unit for generating said base position data signal to indicate said base station position in said three-dimensional coordinate system, said base position unit is adapted to generate said base position data signal from a control signal received from said base station; and a delay computation unit for receiving said measurement signal and generating therefrom a required delay measured relative to a received communication signal transmitted from the transceiver to the base station, the required delay providing for the received communication signal to arrive at the base station in alignment with a time slot assigned thereto;

wherein said propagation delay compensation device is disposed aboard a mobile platform.

4. The propagation delay compensation device of claim 3, further comprising a synchronization adjuster for receiving said delay signal and response thereto, adjusting respective times of generation of data transmissions from said transceiver, said times of generation being adjusted for alignment of said data transmissions with respective time slots assigned thereto at said base station.

5. The propagation delay compensation device of claim 4, wherein said base station is adapted to receive said data transmissions in accordance with a time division multiple access signaling format providing the respective time slots for said data transmissions and including a guard field in each of said respective time slots.

6. The propagation delay compensation device of claim 3, wherein said position location apparatus includes an electronic navigation system receiver.

7. The propagation delay compensation device of claim 6, wherein said electronic navigation system receiver comprises a global positioning system receiver.

8. A method of propagation delay compensation, comprising the steps of:

receiving a base position data signal and a transceiver position data signal, said base position data signal identifying position of a base station in a time division multiple access communications system and said transceiver position data signal identifying position of a transceiver assigned to said base station, wherein said transceiver is disposed aboard an airborne platform;

generating an indication of altitude of said airborne platform, said transceiver position signal representing transceiver position data including an altitude value corresponding to said indication of said altitude, transceiver longitude data indicating longitude of said airborne platform, and transceiver latitude data indicating latitude of said airborne platform, said base position data signal representing base position data including base longitude data indicating longitude of said base station and base latitude data indicating latitude of said base station;

generating, from said received transceiver position data signal and said received base position data signal, a measurement signal representing a line of sight range between said transceiver and said base station, the step of generating a measurement signal comprises the steps of:

computing ground distance between said airborne platform and said base station from said transceiver latitude data, said transceiver longitude data, said base latitude data, and said base longitude data;

computing a height difference by subtracting height of an antenna tower at said base station from said altitude value; and     computing as said line of sight range the positive square root of the sum said height difference squared and said ground distance squared;

generating, from said measurement signal, a required delay measured relative to a communications signal transmitted from said transceiver and received at said base station, the required delay providing for the received communications signal to arrive in alignment with a time slot assigned thereto; and adjusting respective times of generation of data transmissions from said transceiver in accordance with said required delay for alignment of data transmissions with respective time slots assigned thereto at said base station.

9. The method of propagation delay compensation of claim 8, wherein said transceiver position data signal indicates position of said transceiver in a three-dimensional coordinate system and said base position data signal indicates position of said base station in said three-dimensional coordinate system.

10. The method of propagation delay compensation of claim 8, further comprising the steps of:

receiving a transceiver position signal from a position location apparatus disposed in close proximity to said transceiver;

generating said transceiver position data signal from said transceiver position signal;

receiving a control signal from said base station; and generating said base position data signal from said control signal.

11. A method for propagation delay compensation used in a time division multiple access communications system having a base station and a transceiver assigned to said base station, the method comprising the steps of:

receiving a base position data signal and a transceiver position data signal, said base position data signal identifying position of a base station in a time division multiple access communications system and said transceiver position data signal identifying position of a transceiver assigned to said base station;

generating, from said base position data signal and said transceiver position data signal, a measurement signal for line of sight range between said base station and said transceiver;

generating said transceiver position data signal to indicate said transceiver position in a three-dimensional coordinate system;

generating said base position data signal to indicate said base station position in said three-dimensional coordinate system;

receiving said measurement signal and generating therefrom a required delay measured relative to a received communication signal transmitted from the transceiver to the base station, the required delay providing for the received communication signal to arrive at the base station in alignment with a time slot assigned thereto,     wherein said step of receiving said measurement signal and generating therefrom a required delay is performed on a mobile platform.

\* \* \* \* \*